March 6, 1934.   J. B. HIGH   1,950,304
COOKING, COOLING, AND TESTING PROCESS
Filed Oct. 14, 1930
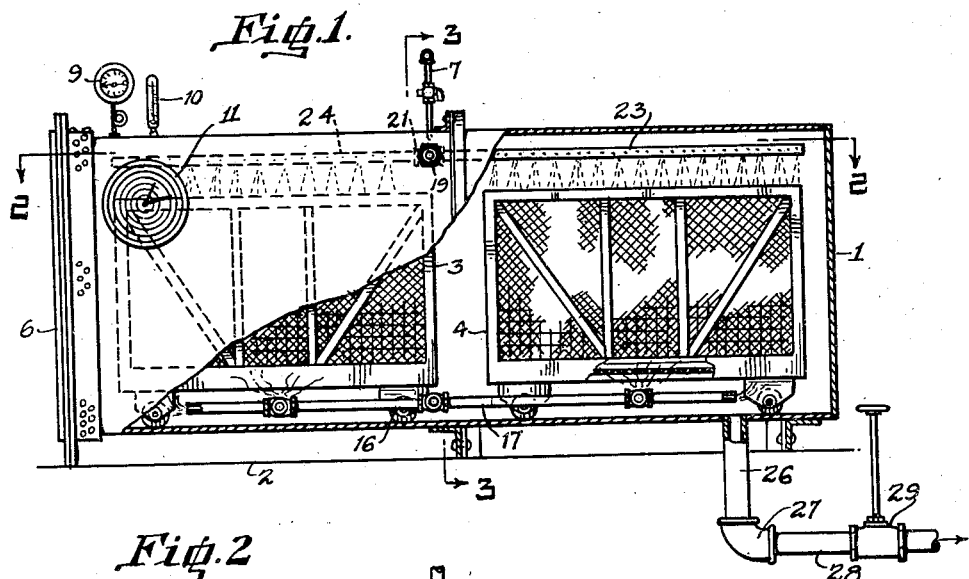
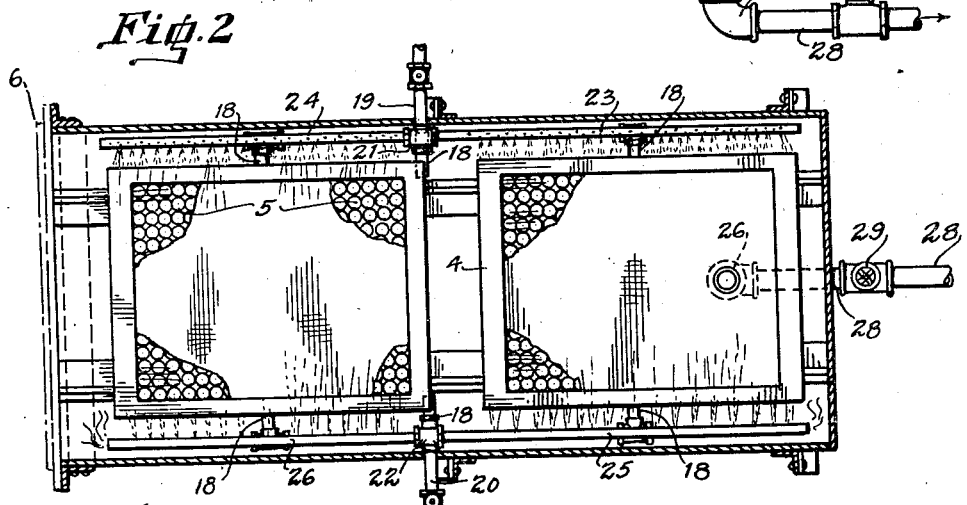
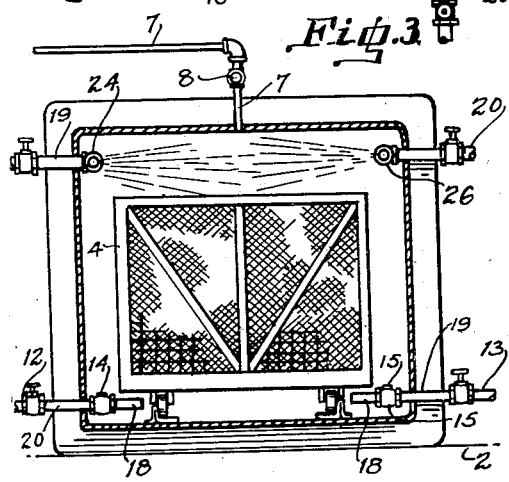
Inventor
Joseph B. High
By Mason Fenwick Lawrence
Attorneys Patented Mar. 6, 1934

1,950,304

UNITED STATES PATENT OFFICE 1,950,304

COOKING, COOLING, AND TESTING PROCESS

Joseph Benton High, Bunnell, Fla.

Application October 14, 1930, Serial No. 488,683

4 Claims. (Cl. 99—8)

The invention forming the subject matter of this application includes cooking and cooling apparatus for canned goods, combined with pressure and temperature regulating means, operable during the cooking and cooling operations to process the canned goods so that the packed cans show by mere inspection, after processing, whether or not their contents are suitable for human consumption.

The main object of the invention is to provide a system of processing canned goods so as to eliminate the necessity of testing each can, after completion of the processing, in order to determine defects in the canning operations which would render the canned goods unfit for consumption.

Another object of the invention is to provide improvements in the cooking parts of the system, whereby the heat used for cooking is substantially uniformly distributed to effect substantially the same degree of cooking in all the cans of a batch being cooked.

A further object of the invention is to provide apparatus of this type with a novel system of cooling water sprays arranged to play over cans, previously subjected to cooking, and to effect a substantially uniform distribution in the cooling effect of the water on the cans.

Still another object of the invention resides in the means for controlling the degree of vacuum in the cooking and cooling tanks to effect the necessary gradual reduction in temperature and pressure of the cooked canned goods.

Other objects of the invention will become apparent as the detailed description thereof proceeds.

In the drawing:

Figure 1 is a side elevation of a tank forming part of this invention, parts thereof being broken away and illustrated in longitudinal section to show details of construction, the location of trucks containing canned goods to be processed.

Figure 2 is a horizontal section taken on the line 2—2 of Figure 1, and

Figure 3 is a front end elevation of the device shown in Figure 1 with a door removed.

As shown in the drawing, the cooking and cooling tank 1 is suitably supported on a floor or platform 2, and is adapted to receive the trucks 3 and 4 containing cans 5 of goods to be processed. These trucks are of the usual type in which suitable open framework has meshed wire secured thereto to form retaining walls and bottom for the canned goods and at the same time permit the passage of fluids therethrough for cooking and subsequently cooling the goods.

One end of the tank 1 has a door 6, suitably secured thereto to permit insertion and removal of the trucks 3 and 4 in the tank 1. An air exhaust pipe 7 extends from and through the top of the tank 1 and is provided with a pet cock or valve 8 to permit the exhaust of air and regulate the pressure within the tank 1. A pressure gage 9 and temperature indicator 10 are also mounted on the tank 1 to indicate the pressure and temperature within the said tank; and a combination temperature and pressure recorder 11 is suitably secured to the tank 1 to make a permanent record of the temperatures and pressures and variations thereof in the said tank.

Steam for cooking the canned goods is forced into the tank 1 through valve controlled pipes 12 and 13 which pass through the opposite side walls of the tank 1 to T-fittings 14 and 15 respectively. Pipes 16 and 17 branch out laterally from opposite sides of these fittings and include any desired number of T-fittings to receive short branches 18 which extend inwardly toward the center of the tank.

These steam pipes and branches are mounted so as to inject the cooking steam into each side of the tank and to distribute it uniformly under and along the bottoms of the can trucks. This distribution of the steam ensures a uniform building up of cooking heat in the tank with resultant uniform cooking of the contents of all the cans in the tank. The application of the cooking heat and distribution thereof directly under the bottom of the can trucks, heats the contents uniformly and thereby ensures a more uniform cook than can be obtained by the application of heat at only one or two points without distribution. In prior devices of this kind, in which steam is introduced without distribution, cans near the steam inlet become overcooked, while others remote from this inlet are undercooked, inasmuch as exposure to heat for a predetermined time is depended upon for effective cooking.

For cooling the contents of the tank 1, after cooking, valve controlled water inlet pipes 19 and 20 extend through the opposite side of the tank 1 to T-fittings 21 and 22 respectively. Branches 23—24 and 25—26 extend laterally from the opposite ends of the respective T-fittings 21 and 22; and are perforated so as to form several hundred small sprays playing against each other and against the tops of containers filled with cans, thereby forming a massive spray distributed substantially uniformly over the cans, with a corresponding uniform distribution of the cooling effect of the water.

A water outlet pipe 26 extends from the bottom of tank 1 to an L-fitting 27 having an outlet pipe 28 connected thereto and controlled by a valve 29. This valve controlled water outlet cooperates with the air valve 8 in determining the degree of vacuum within the tank 1, in order to apply the requisite degree of vacuum during the cooling of the cans to cause cans having too low degrees of vacuum to swell or bulge, because the vacuum within such cans is less than the vacuum on the outside thereof.

In the operation of this apparatus, the packed and sealed cans are taken from the can sealing machines and stacked in the wire mesh trucks 3 and 4 so as to permit the cooking steam to have all possible heating contact with all the cans in a truck. The loaded trucks are then moved into the processing tank 1, with their bottoms arranged above the steam jets and their tops below the water sprays, and the door 6 is securely closed.

The temperatures to which the cans are exposed and the times of exposure will obviously vary with the material being processed. These temperatures and times can of course only be determined by experiment with the different materials and when once determined will not vary in the subsequent processing of batches of the same material.

When the goods are properly processed each can should have a predetermined degree of vacuum at normal atmospheric temperature (about 80 degrees) in order that their contents may be properly preserved and in order to indicate by the extent or absence of swelling or bulging of its ends whether or not the canned produce is suitable for long keeping or domestic trade, or should be destroyed.

By way of example: This particular process and apparatus has been in actual use for canning and preserving potatoes. In this case, the potatoes after washing, peeling and blanching were packed in previously steamed and heated cans, filled with a saline solution and passed through a steam exhauster from which they were passed to can closing machines where the lids were placed on the cans and the cans sealed. Assuming that the potatoes were properly sealed, it follows that each can should have a substantially fixed degree of vacuum in order that its contents might be properly preserved.

The filled and sealed cans placed in the wire mesh trucks, are moved into the cooking tanks or retorts 1 and these retorts were then closed steam tight. Steam is then admitted under ten pounds pressure, controlled by a pressure reducing valve, in order to insure dry steam of sufficient heat to obtain a cooking heat of 240° F. at ten pounds pressure. The pressure and temperature are then brought up step by step until a temperature of 240° F. at ten pounds pressure is reached and these conditions were maintained for about twenty minutes, at the end of which period the product is cooked.

The cans thus subjected to cooking heat must be cooled gradually and under gradually decreasing pressures until they reach atmospheric pressure and temperatures. To effect this decrease in temperature and pressure the steam is turned off and the water spray is gradually turned on, the cooling beginning under the ten pounds pressure already in the tank which gradually diminishes until the temperature indicator passes 210° F. The sprays are then turned on with increased volume, (pressure always about thirty pounds or more), until the retort temperature has dropped to about 150° F. and pressure has decreased to two or three pounds. Then the air outlet valve 8 is slightly opened and the water outlet valve is partly opened until water begins to flow at which time the pressure within the retort has diminished to zero. The air valve is then closed and the water continues to flow out of the retort and causes a vacuum to show on the pressure indicator.

The degree of vacuum in the retort can be controlled by operating the air and water valves, opening of the air valve decreasing the vacuum by admitting air to the retort, and increasing by outward flow of water. A vacuum of fifteen inches has been produced in this way, but in practical operation the vacuum was held at eight inches for several minutes, as the cans thus processed and cooled would be suitable for the market if they contain five inches or more of vacuum. However, the test can be applied to any number of inches less than fifteen which may be required.

After all the water is exhausted from the retort, and the pressure back to zero, the cans can be removed from the trucks to be stored, cased or labeled.

In the stacking, casing or handling of the cans, the cans are inspected for bulges or swells on the ends. A can containing a vacuum of less than the predetermined amount for testing, will show a bulged end, a can containing the predetermined test amount of vacuum or more will show normal at its ends.

Of course a can showing normal on its removal from the retort contains the predetermined amount of vacuum, at least, and is suitable for long storage. The end swells on defective cans will remain for a length of time depending upon the vacuum content. If the content is low, the end swell will remain until the can is cooled below atmospheric temperature, whereas if the end swell is very close to the predetermined test amount, the end swell will recede and the can appear normal at slightly above normal atmospheric temperature.

In stacking or removing the cans from the containers in which they are cooked, the cans are observed and all bulged ends are set aside for further observation, those "going back" at temperatures above ninety degrees may contain sufficient vacuum for domestic trade, but would not be suitable for long storage or export trade. Those which do not "go back" until atmospheric temperature, (eighty degrees in the present case), would be, and were, found to contain zero vacuum and therefore not fit for market.

The apparatus operated for cooking and cooling, as described, eliminates the necessity for using separate can testing machines. The very process of cooking and cooling with the accompanying reduction in pressure and subjection to vacuum of the retort, provides a means for indicating by mere inspection of the processed cans whether or not their contents are under proper vacuum for preservation. The operation is thus effected without additional cost in cases where the product is cooked and cooled in the usual manner.

The test can also be applied to any canned product, and in large quantities, without damaging the product, and regardless of the length of time elapsed since the product was canned. It is not limited by any means to testing canned goods by the heating and cooling operations applied during the initial processing of the goods.

The test can also be applied to any and all forms of pressure cookers, now commonly used in the canning industry, by the proper arrangement of water sprays, outlet air valve and outlet water valve. It is not limited to the testing of cans processed or cooked in the horizontal type of cooker, or retort but may be applied to the vertical type as well and is further applicable to the continuous type of cooler.

What I claim is:

1. The process of packing, cooking and testing canned goods which consists in packing and sealing the goods in cans under a predetermined vacuum, simultaneously subjecting the sealed cans to heat of predetermined temperature under predetermined pressure, gradually reducing the temperature and pressure until the cans are subjected to heat at a predetermined temperature lower than the first temperature, and until the pressure decreases to a vacuum greater than said predetermined vacuum, for producing "swells" in cans having less vacuum than said predetermined vacuum.

2. The process of testing canned goods, each can of which when properly packed and sealed contains a predetermined vacuum, which process consists in simultaneously subjecting said cans to heat of predetermined temperature under predetermined pressure, gradually reducing the temperature and pressure until the cans are subjected to heat at a predetermined temperature lower than the first temperature, and until the pressure decreases to a vacuum greater than said predetermined vacuum, for producing "swells" in cans having less vacuum than said predetermined vacuum.

3. The process of testing canned goods, each can of which when properly packed and sealed contains a predetermined vacuum which process consists in subjecting the can to heat of predetermined temperature, gradually reducing the temperature until the cans are subjected to heat at a predetermined temperature lower than the first temperature, applying a vacuum to said cans, under the reduced temperature, greater than said predetermined vacuum for producing "swells" in cans having less vacuum than said predetermined vacuum.

4. The process of packing, cooking and testing canned goods, which consists in packing and sealing the goods in cans under a predetermined vacuum, subjecting the sealed cans to a temperature of approximately two hundred forty degrees F. under a pressure of approximately ten pounds for a period of time necessary to cook the goods in said cans, then reducing the temperature and pressure gradually until the temperature reaches approximately 150° F. and the pressure about two pounds, and finally reducing the pressure until the cans are subjected to a vacuum greater than said predetermined vacuum, to produce "swells" in cans having less than said predetermined vacuum.

JOSEPH BENTON HIGH.